(12) United States Patent
van Rotterdam et al.

(10) Patent No.: US 10,970,536 B2
(45) Date of Patent: *Apr. 6, 2021

(54) METHOD AND SYSTEM FOR ASSESSING SIMILARITY OF DOCUMENTS

(71) Applicant: Open Text Corporation, Waterloo (CA)

(72) Inventors: Jeroen Mattijs van Rotterdam, Fort Lauderdale, FL (US); Michael T Mohen, Columbia, MD (US); Chao Chen, Shanghai (CN); Kun Zhao, Shanghai (CN)

(73) Assignee: Open Text Corporation, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/692,005

(22) Filed: Nov. 22, 2019

(65) Prior Publication Data

US 2020/0089947 A1 Mar. 19, 2020

Related U.S. Application Data

(63) Continuation of application No. 15/811,118, filed on Nov. 13, 2017, now Pat. No. 10,521,656, which is a (Continued)

(51) Int. Cl.
*G06K 9/00* (2006.01)
*G06F 16/93* (2019.01)
*G06F 16/335* (2019.01)

(52) U.S. Cl.
CPC ....... *G06K 9/00483* (2013.01); *G06F 16/335* (2019.01); *G06F 16/93* (2019.01); *G06K 9/00469* (2013.01)

(58) Field of Classification Search
CPC ... G06F 16/335; G06F 16/93; G06K 9/00469; G06K 9/00483
See application file for complete search history.

(56) References Cited

U.S. PATENT DOCUMENTS 7,877,258 B1 1/2011 Chelba et al.
8,620,842 B1 12/2013 Cormack
(Continued)

OTHER PUBLICATIONS

Office Action for U.S. Appl. No. 14/871,501, dated Mar. 2, 2017, 16 pgs.

(Continued)

*Primary Examiner* — Ian L Lemieux
(74) *Attorney, Agent, or Firm* — Sprinkle IP Law Group (57) ABSTRACT

Systems and methods for assessing similarity of documents are provided. Embodiments of the systems and methods include extracting a reference document text from a reference document, extracting an archived document text from an archived document, and quantifying the reference document and the archived document. The systems and methods may also include determining a document similarity value of the quantified reference document and the archived document. Determining the document similarity value includes calculating a set of vector similarity values for a set of combinations of a reference document text vector and an archived document text vector, and calculating the document similarity value, including a sum of the plurality of vector similarity values.

18 Claims, 8 Drawing Sheets

Related U.S. Application Data continuation of application No. 14/871,501, filed on Sep. 30, 2015, now Pat. No. 9,852,337.

(56) References Cited

U.S. PATENT DOCUMENTS

| | | | |
|---|---|---|---|
| 8,761,512 B1 | 6/2014 | Buddemeier et al. | |
| 8,954,440 B1 | 2/2015 | Gattani et al. | |
| 9,852,337 B1 | 12/2017 | van Rotterdam et al. | |
| 10,459,970 B2* | 10/2019 | Zhu | G06F 16/9535 |
| 10,521,656 B2 | 12/2019 | Van Rotterdam | |
| 2003/0074368 A1 | 4/2003 | Schuetze et al. | |
| 2007/0220023 A1* | 9/2007 | Dean | G06F 16/93 |
| 2007/0237401 A1 | 10/2007 | Coath | |
| 2007/0266044 A1* | 11/2007 | Grondin | G06F 16/113 |
| 2009/0210828 A1* | 8/2009 | Kahn | G06F 40/247 |
| | | | 715/854 |
| 2010/0331041 A1 | 12/2010 | Liao | |
| 2012/0209853 A1* | 8/2012 | Desai | G06F 16/93 |
| | | | 707/741 |
| 2012/0271827 A1 | 10/2012 | Merz | |
| 2013/0254171 A1* | 9/2013 | Grondin | G06F 16/256 |
| | | | 707/693 |
| 2014/0081626 A1 | 3/2014 | Chang et al. | |
| 2014/0195532 A1* | 7/2014 | Dheap | G06F 16/901 |
| | | | 707/736 |
| 2015/0206031 A1 | 7/2015 | Lindsay et al. | |
| 2016/0055188 A1* | 2/2016 | Goel | G06F 16/148 |
| | | | 707/741 |
| 2016/0232157 A1 | 8/2016 | Mansour et al. | |
| 2016/0332079 A1* | 11/2016 | Mugan | A63F 13/00 |
| 2016/0379009 A1* | 12/2016 | Lee | G06F 16/951 |
| | | | 713/164 |
| 2017/0004129 A1 | 1/2017 | Shalaby et al. | |
| 2017/0031894 A1 | 2/2017 | Bettersworth et al. | |
| 2017/0147828 A1* | 5/2017 | Kurian | G06F 21/6218 |
| 2017/0147829 A1* | 5/2017 | Cismas | G06F 21/6218 |
| 2017/0185680 A1 | 6/2017 | Tang et al. | |
| 2017/0255693 A1* | 9/2017 | Trifunovic | G06F 16/907 |
| 2018/0068183 A1 | 3/2018 | van Rotterdam et al. | |
| 2019/0057258 A1* | 2/2019 | Simske | G06K 9/00718 |
| 2019/0102413 A1* | 4/2019 | Hsu | G06F 16/2237 |
| 2019/0342088 A1* | 11/2019 | Eidson | H04L 9/14 |
| 2019/0364062 A1* | 11/2019 | Xu | G06N 20/00 |

OTHER PUBLICATIONS

Guthrie, David, et al., "A closer look at skip-gram modelling," Proceedings of the Fifth International Conference on Language Resources and Evaluation, LREC, 2006 pp. 1222-1225.

Mikolov, Tomas, et al., Distributed representations of words and phrases and their compositionality, Proceedings, Advances in Neural Information Processing Systems, 26 pp. 3111-3119.

Paul, Christian, et al., "Efficient graph-based document similarity," 2016 and Springer Int'l Publishing, Switzerland, 2016, pp. 334-348.

Google Code Archive word2vec (2013), at <https://code.google.com/archive/p/word2vec/>, retrieved Feb. 22, 2017, 8 pgs.

Office Action for U.S. Appl. No. 15/811,118, dated Mar. 6, 2019, 23 pgs.

Notice of Allowance for U.S. Appl. No. 15/811,118, dated Aug. 29, 2019, 6 pgs.

* cited by examiner

METHOD AND SYSTEM FOR ASSESSING SIMILARITY OF DOCUMENTS

CROSS-REFERENCE TO RELATED APPLICATIONS

This application is a continuation of, and claims a benefit of priority under 35 U.S.C. § 120 to U.S. patent application Ser. No. 15/811,118, filed Nov. 13, 2017, entitled "METHOD AND SYSTEM FOR ASSESSING SIMILARITY OF DOCUMENTS," issued as U.S. Pat. No. 10,521,656, which is a continuation of, and claims a benefit of priority under 35 U.S.C. § 120 to U.S. patent application Ser. No. 14/871,501 filed Sep. 30, 2015, entitled "METHOD AND SYSTEM FOR ASSESSING SIMILARITY OF DOCUMENTS," issued as U.S. Pat. No. 9,852,337, the entire contents of which are hereby expressly incorporated by reference for all purposes.

BACKGROUND

A significant amount of electronic documents are stored by companies in their document repositories. Given the number of documents that are stored, it is difficult to easily locate relevant documents related to a given topic.

BRIEF DESCRIPTION OF DRAWINGS

FIGS. 2-5B show flowcharts in accordance with one or more embodiments of the technology.

DETAILED DESCRIPTION

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology are directed to methods and systems for identifying documents that contain content similar to the content of a reference document. More specifically, in one or more embodiments of the technology, the content analyzed for similarities is text. Text of a reference document may be compared to text of multiple other documents, for example, text located in archived documents. The methods may be employed, for example to perform electronic discovery (e-discovery) in litigation and/or government investigations, where a large volume of archived documents may need to be reviewed for relevance, in view of a reference document (e.g., a legal document).

In one or more embodiments of the technology, the similarity analysis is performed by extracting the texts, which may include extracting text bodies of documents and metadata sections of documents, by quantifying the extracted texts, for example, using natural language processing methods, and by subsequently analyzing the quantified texts for similarities. The similarity analysis is described below, with reference to FIGS. 2-5B.

Figure 1:
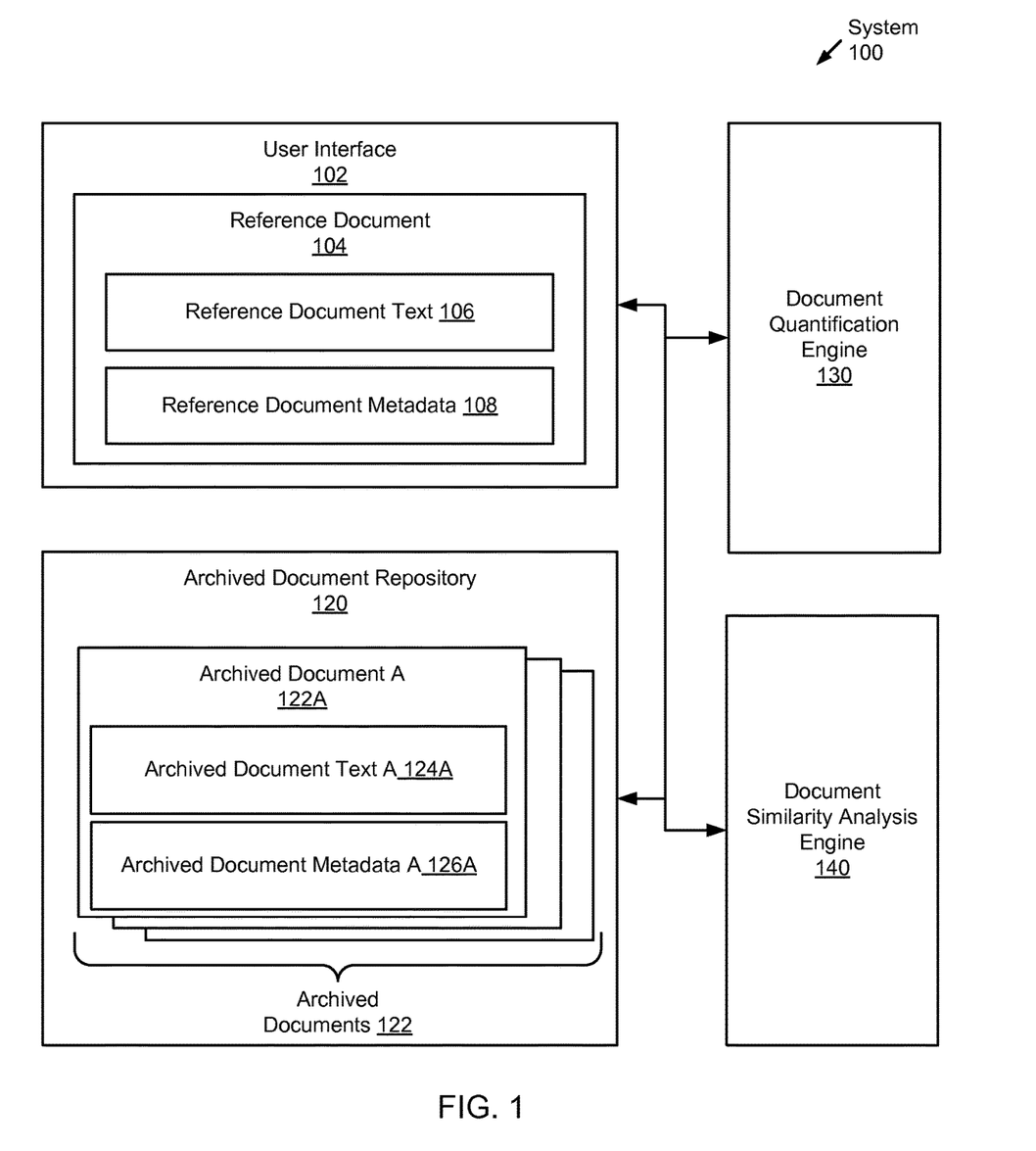
FIG. 1 shows a system in accordance with one or more embodiments of the technology.

FIG. 1 shows a schematic diagram of a system in accordance with one or more embodiments of the technology. Specifically, FIG. 1 shows a schematic diagram of a system (100) enabling users of the system to analyze documents for similarity with a reference document. The system may include a user interface (102), an archived document repository (120), a document quantification engine (130) and a document similarity analysis engine (140). Each of these components is described in detail below.

In one or more embodiments of the technology, a user may access the user interface (102) in order to identify, in a set of documents, documents that include content similar to the content of a reference document (104) provided by the user. Accordingly, the user interface may enable the user to specify the reference document. The reference document may be specified by the user, for example, by uploading the reference document, or by selecting the reference document from a set of documents that are accessible via the user interface. The user interface (102) may further be used to present the results of the document identification (i.e., the identified documents) to the user. The identified documents may be presented to the user, for example, in the form of a document list. Further, the detected similarities may be presented to the user via the user interface, for example by highlighting similar content in documents displayed to the user. The user interface may in addition be used to configure the document identification. For example, the user interface may enable the user to specify an archived document repository from where documents to be analyzed for similarities may be obtained, it may enable the user to select document identification parameters (as further discussed below), etc.

Figure 6:
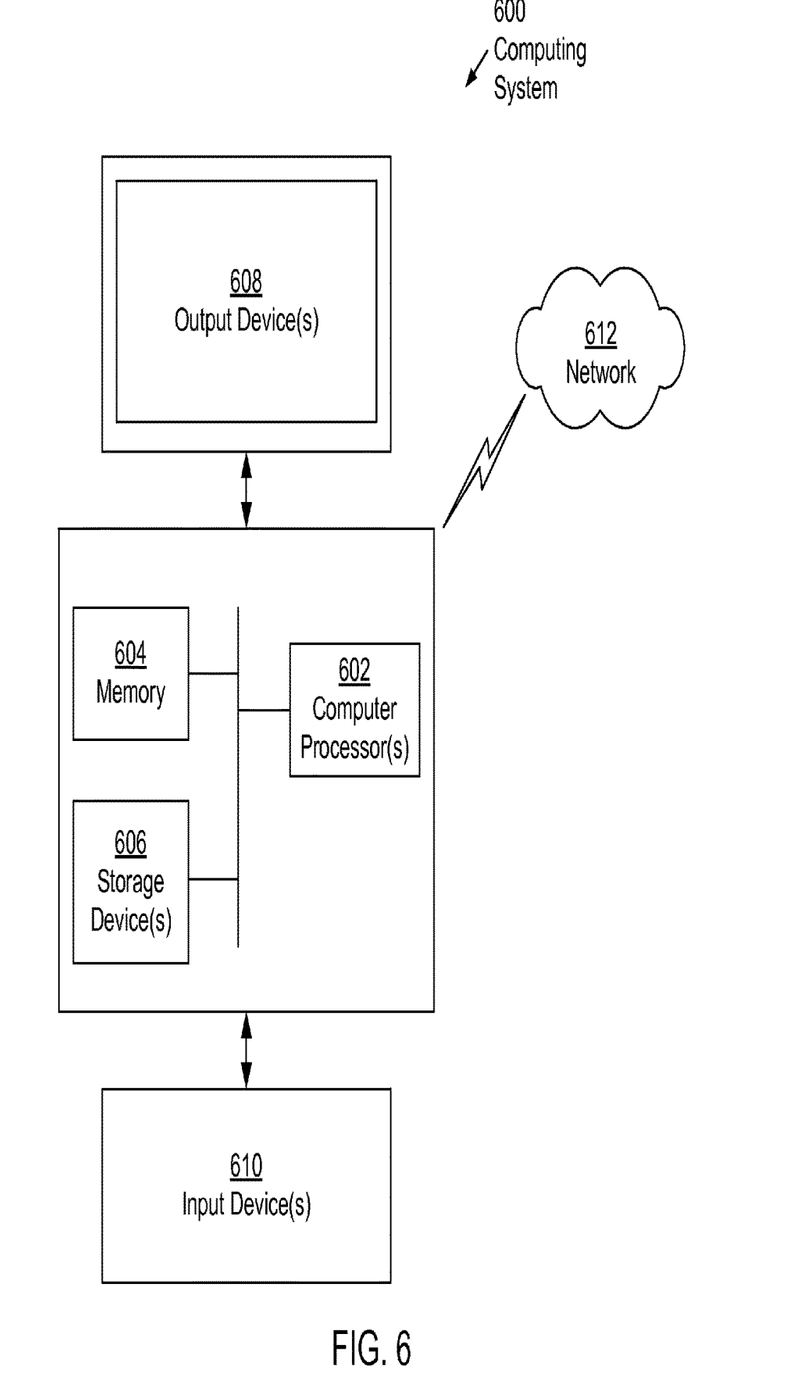
FIG. 6 shows a computing system in accordance with one or more embodiments of the technology.

The user interface, in accordance with one or more embodiments of the technology, may be executing on a computing device similar to the exemplary computing device shown in FIG. 6. In one or more embodiments of the technology, the user interface may interface with the archived document repository (120), the document quantification engine (130) and the document similarity analysis engine (140).

As previously described, the user interface may enable the user to specify the reference document (104). The reference document, in accordance with one or more embodiments of the technology, includes text. The reference document may be provided in any file format suitable for the storage of text, and may include, for example, plain text files (.txt), Microsoft® Word files (.doc, .docx), Adobe® Acrobat files (.pdf), etc. Those skilled in the art will appreciate that the technology is not limited to the aforementioned protocols. Rather, any file that may contain text, either exclusively, or in combination with non-text content (e.g. CAD files), regardless of the file format, may be processed. A reference document may include a reference document text (106)

and/or reference document metadata (108). The reference document text may include content of the reference document, whereas the metadata may provide additional information describing the content. For example, the metadata may provide annotations (or information) of the document text, including creation times, modification times creation dates, modification dates, locations, text formatting instructions, etc. In one embodiment of the technology, the metadata may be separate from the reference document text (e.g., stored in a separate file). In this case, metadata may be generated upon receipt of the reference document, based on information entered by a user and/or based on information extracted from the reference document, including metadata in the reference document.

Continuing with the discussion of FIG. 1, in one or more embodiments of the technology, the system (100) includes an archived document repository (120). The archived document repository may store the archived documents (122). The archived document repository may be any type of document storage suitable for storing at least one document. The document repository may be, for example, and enterprise content management system, a database, a folder or a group of folders on a storage device. The archived document repository may be local, i.e., it may be located on the computing device on which the user interface is executing, or it may be remote, e.g., located on a physical server. The archived document repository may be stored on any type of non-volatile storage, including, for example, a hard disk drive, a redundant array of independent disks (RAID), network attached storage (NAS), cloud storage, etc. Further, at least some of the content of the data repository may alternatively or additionally be stored in volatile memory, e.g., in RAM.

Similar to the reference document (104), archived documents (122) may be stored in any file format suitable for the storage of text. These file formats may include, for example, plain text files (.txt), Microsoft® Word files (.doc, .docx), Adobe® Acrobat files (.pdf), etc. An archived document may include an archived document text and/or archived document metadata. For example, archived document A (122A) includes archived document text A (124A) and archived document metadata A (126A).

Analogous to the previously described reference document, the archived document text of an archived document may include content of the archived document, whereas the archived document metadata may provide additional information describing the content of the archived document. In one embodiment of the technology, an archived document may have undergone initial processing at the time it was added to the archived document repository. The initial processing may have included the generation of the archived document metadata, based on information entered by a user and/or based on information extracted from the reference document, including metadata in the reference document.

Continuing with the discussion of FIG. 1, the system (100) further includes the document quantification engine (130). In one or more embodiments of the technology, the document quantification engine executes software instructions in the form of non-transitory computer readable program code described in detail below, with reference to FIGS. 2 and 3. The instructions may enable the document quantification engine (130) to convert a reference document and one or more archived documents into a form that allows for quantitative assessment of document similarity. The instructions may, for example, include functionality to tokenize text and/or metadata and to vectorize the tokens, as further described below, with reference to FIG. 3. The document quantification engine (130) may execute on a computing device that may be similar to the exemplary computing device shown in FIG. 6, and may be any type of mobile, desktop, server, embedded, or other hardware capable of performing at least one of the steps described below with reference to FIGS. 2 and 3.

In one or more embodiments of the technology, the system (100) further includes the document similarity analysis engine (140). The document similarity analysis engine may execute software instructions in the form of non-transitory computer readable program code described in detail below, with reference to FIGS. 2, 4A-5B. The instructions may enable the document similarity analysis engine (140) to assess the similarity of a reference document and an archived document that were previously quantified by the document quantification engine (130). The document similarity analysis engine (140) may execute on a computing device that may be similar to the exemplary computing device shown in FIG. 6, and may be any type of mobile, desktop, server, embedded, or other hardware capable of performing at least one of the steps described below with reference to FIGS. 2, 4A-5B. The document similarity analysis engine may be executing on a computing device that is also executing the document quantification engine, or it may be executing on a separate computing device.

One skilled in the art will recognize that the architecture of the system is not limited to the components shown in FIG. 1. For example, the system may not include an archived document repository. Instead, the user may provide archived documents to be analyzed against a reference document. Further, the components of the system may be collocated on a single computing device, or they may be distributed in various ways. For example, one or more of the components may be located on a server, in a data center, in the cloud, etc. The components may be provided by a single entity, or by multiple entities.

If components of the system are distributed, the components may be connected via a network (e.g., a local area network (LAN), a wide area network (WAN) such as the Internet, mobile network, or any other type of network) enabling the components, including the user interface, the archived document repository, the document quantification engine and/or the document similarity analysis engine, to communicate. The network may include implement any combination of wired and/or wireless communication protocols. The communication between the components of the system (100) may include any combination of secured (e.g., encrypted) and non-secured (e.g., un-encrypted) communication. The manner in which the components of the system communicate may vary based on the implementation of the technology.

Figure 2:
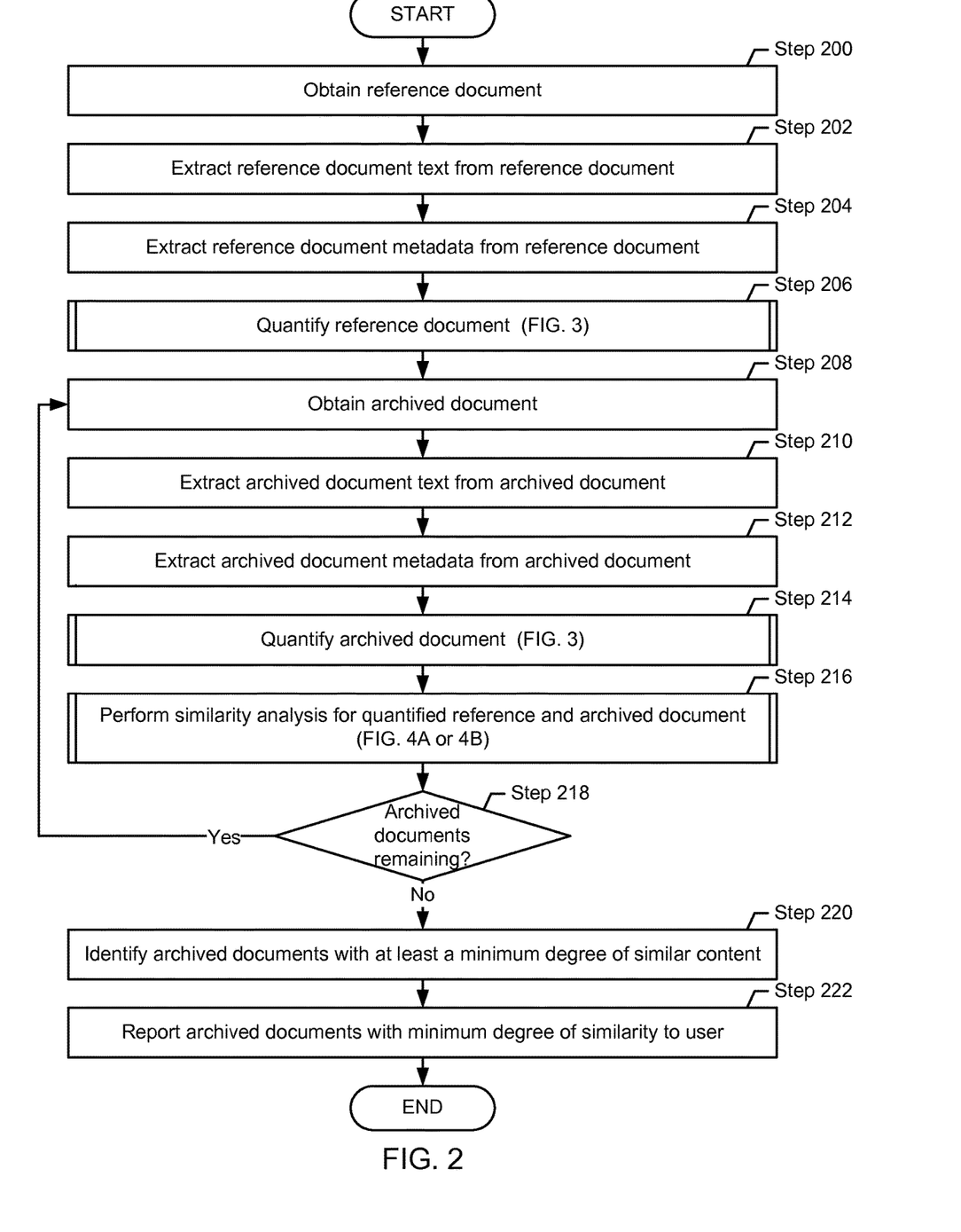

FIGS. 2-5B show methods for assessing the similarity of documents, in accordance with one or more embodiments of the technology. FIG. 2 provides an overview of the methods, whereas FIGS. 3, 4A, 4B, 5A and 5B describe additional details of various aspects of the methods.

While the various steps in the flowcharts are presented and described sequentially, one of ordinary skill will appreciate that some or all of these steps may be executed in different orders, may be combined or omitted, and some or all of the steps may be executed in parallel. In one embodiment of the technology, the steps shown in FIGS. 2-5B may be performed in parallel with any other steps shown in FIGS. 2-5B without departing from the technology.

FIG. 2 shows a method for identifying documents that include content similar to content in a reference document, in accordance with one or more embodiments of the technology. The execution of the method may be triggered by a user providing a reference document and requesting the identification of documents with similar content. The user, when making the request, may also provide parameters that may affect the execution of the method, as further described below.

Turning to FIG. 2, in Step 200, the reference document is obtained. In one or more embodiments of the technology, the reference document corresponds to the document against which other archived documents will be compared in order to identify archived documents that are similar to the reference document. The reference document may be obtained from a user providing the document. Alternatively, the reference document may be obtained from a document repository, based on instructions provided by the user.

In Step 202, the reference document text is extracted from the reference document. Extracting the reference document text may include identifying the reference document text, and isolating the reference document text from other components in the reference document (e.g., images, metadata, etc.). Extracting the reference document text may be file format specific, e.g., the steps performed to obtain the reference document text from a ".doc" file may be different from the steps performed to obtain the reference document text from a ".pdf" file.

In Step 204, the reference document metadata is extracted from the reference document. Extracting the reference document metadata, may include identifying the reference document metadata, and isolating the reference document metadata from other components in the reference document (e.g., images, text, etc.). The steps required for extracting the reference document metadata may be file format specific. Further, the type and amount of metadata available may also be file format specific. In one embodiment of the technology, reference document metadata may be selectively extracted, i.e., metadata that is not relevant for the similarity analysis may be ignored. For example, metadata that includes formatting instructions may not be extracted. In one embodiment of the technology, metadata, describing aspects of the reference document, is available outside the reference document, e.g., in a separate metadata file and/or metadata database entry, affiliated with the reference document. In this case, extracting the metadata may include obtaining the metadata from the file and/or database.

In Step 206, the reference document may be quantified. The quantification may convert words, linguistic units, sentences or entire paragraphs into vectors or other numerical representations. In one or more embodiments of the technology, quantification of the reference document is a prerequisite for the subsequent similarity analysis. The quantification may include a quantification of the reference document text and of the reference document metadata. The quantification, in accordance with an embodiment of the technology, may be performed using natural language processing methods. The details of Step 206 are described in FIG. 3.

In Step 208, an archived document is obtained. In one or more embodiments of the technology, an archived document is a document to be analyzed for content similar to the content in the reference document. The file format of the archived document may be identical to the file format of the reference document, or it may be different.

In one or more embodiments of the technology, there may be multiple archived documents to be analyzed. For example, the user, prior to initiating the execution of the method described in FIG. 2, may have requested to analyze all documents in the archived document repository, a range of documents in the archived document repository, or selected documents of the documents in the archived document repository. Alternatively, or additionally, the user may upload documents to be analyzed. In cases where multiple documents to be analyzed are available, one of these documents is selected as the archived document to be analyzed. Other documents may be analyzed in subsequent iterations of the method, as further described below, with reference to Step 218.

In Step 210, the archived document text is extracted from the archived document. Extracting the archived document text may be performed analogous to the extraction of reference document text from the reference document, described in Step 202. Alternatively, the extraction of the archived document text may have been performed at a time when the document was added to the archived document repository, or after the addition of the archived document to the archived document repository. In this case, the extracted document text may be directly retrieved from the archived document repository, without requiring the extraction of the archived document text, immediately prior to the retrieval.

In Step 212, the archived document metadata is extracted from the archived document. Extracting the archived document metadata, may be performed analogous to the extraction of the reference document metadata from the reference document, described in Step 204. Alternatively, the archived document metadata may be readily available for retrieval from the archived document repository, without requiring prior extraction. The metadata may be obtained, for example, from a metadata file or a metadata entry in the archived document repository.

In Step 214, the archived document may be quantified. The quantification may convert words, linguistic units, sentences or entire paragraphs into vectors or other numerical representations. In one or more embodiments of the technology, quantification of the archived document is a prerequisite for the subsequent similarity analysis. The quantification may include a quantification of the archived document text and of the archived document metadata. The quantification, in accordance with an embodiment of the technology, may be performed using natural language processing methods. The details of Step 214 are described in FIG. 3.

In Step 216, a similarity analysis is performed for the quantified reference document, obtained in Step 206, and the quantified archived document, obtained in Step 214. In one embodiment of the technology, the similarity analysis between the quantified reference document and the quantified archived document is performed based on the similarities between vectors obtained for n-grams, as described in detail in FIG. 4A. In another embodiment, the similarity analysis is performed using a word-path model, based on the similarity of tokens in tokenized sentences, as described in detail in FIG. 4B. Whether the method described in FIG. 4A or the method described in FIG. 4B is used, may be decided by a user of the system, by a system administrator, or it may be decided by the system itself, based on suitability of the methods for a given set of documents.

In Step 218, a determination is made about whether archived documents, where a similarity to the reference document is to be determined, remain. If archived documents remain, the method may return to Step 208. If no archived documents remain, the method may proceed to Step 220.

In Step 220, archived documents with at least a minimum degree of similar content are identified. The identification may be performed based on an absolute degree of similarity.

The document similarity value, obtained for an archived document, may be compared, for example, to a threshold configured by a user. If the document similarity value exceeds the threshold, the archived document may be considered to include sufficiently similar content, to be reported to the user. Alternatively, the archived documents may be ranked based on the document similarity values obtained for them. Top ranking documents, for example the top 10 of the ranked archived documents, or the top 10% of the ranked archived documents may then be considered to include sufficiently similar content, to be reported to the user.

In Step 222, the documents with at least a minimum degree of similar content, selected in Step 220, are reported to the user. A list of these documents may be displayed to the user, or the documents may be automatically displayed via the user interface. Locations in the displayed archived documents may be highlighted to indicate regions in the documents, where content similarities were detected. Further, the user may also be provided with copies of the identified documents.

Figure 3:
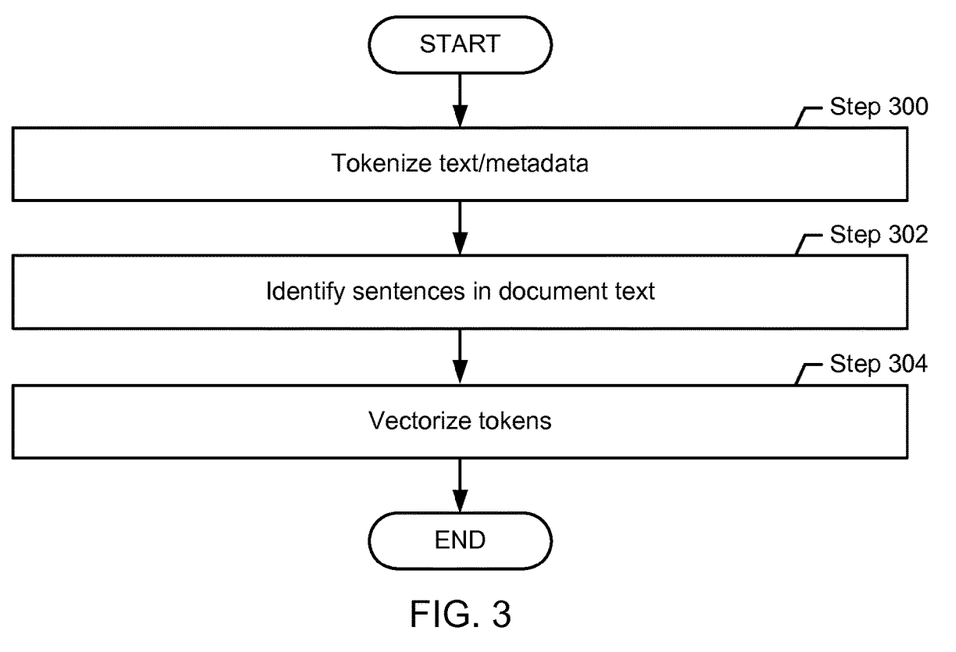

FIG. 3 shows a method for quantifying document text and/or document metadata. The method may be applied to quantify document text/metadata of the reference document and of archived documents.

In Step 300, the text/metadata of the document being quantified is tokenized, i.e., the text/metadata is segmented into linguistic units such as words, punctuation, numbers, alpha-numerics, etc. The tokenization may be performed by an algorithm that separates words based on the detection of "space" characters. Alternatively, or additionally, the tokenization may include linguistically motivated considerations and may include extensions for handling abbreviations, hyphenation, numerical expressions, field-specific vocabulary, and/or for detecting names. In one embodiment of the technology, the tokenization algorithm is language specific. In addition, the tokenization algorithm may be capable of handling spelling errors and unexpected characters. Different tokenization algorithms may be used for tokenizing the text of the document and the metadata of the document, i.e., the tokenization algorithm used for tokenizing the metadata may be designed specifically for tokenizing metadata rather than sentences.

In Step 302, sentences are identified in the document text, based on the tokenization. Sentences may be identified, for example, based on punctuation marks identified during the tokenization in Step 300. After completion of Steps 300 and 302, a tokenized representation of the text of the document may include sentences that include tokens, i.e., tokenized sentences.

In one embodiment of the technology, sentences are also identified in the document metadata, if the metadata includes sentences. In other metadata, e.g., metadata including single values, sets of parameters, etc., no sentences may be identified.

In Step 304, the tokens obtained in Step 302 are vectorized. In one embodiment of the technology, one vector is generated per sentence. Generation of a vector from a tokenized sentence may be performed using a skip-gram vectorization, for example, using a k-skip-n-gram algorithm. In the k-skip-n-gram vectorization, k-skip-n-grams may be generated from a sentence, and the k-skip-n grams may then be vectorized. "k" may define the number of tokens that may be skipped in a sentence, and n may be the length of the n-gram. Consider, for example, the sentence "I hit the tennis ball." The sentence has three 3-grams: "I hit the", "hit the tennis", "the tennis ball". The sentence has 7 1-skip-3 grams: "I hit the", "hit the tennis", "the tennis ball", "I hit tennis", "I the tennis" "hit tennis ball" and "hit the ball". n and k may be configurable parameters of the algorithm.

In one embodiment of the technology, the obtained k-skip-n-grams are subsequently vectorized. One vector may be generated per k-skip-n-gram. The vector may encode semantic information of the k-skip-n-gram in an N-dimensional space. The skip-gram vectorization may be performed using, for example, the "word2vec" function.

In another embodiment of the technology, individual tokens may be vectorized, i.e., the tokens in a sentence may be vectorized directly, without prior generation of k-skip-n-grams. One vector may be generated per token. The vector may represent individual tokens in an N-dimensional space and may encode semantic information of the token. The vectorization of individual tokens may be performed using, for example, the "word2vec" function.

Figure 4A:
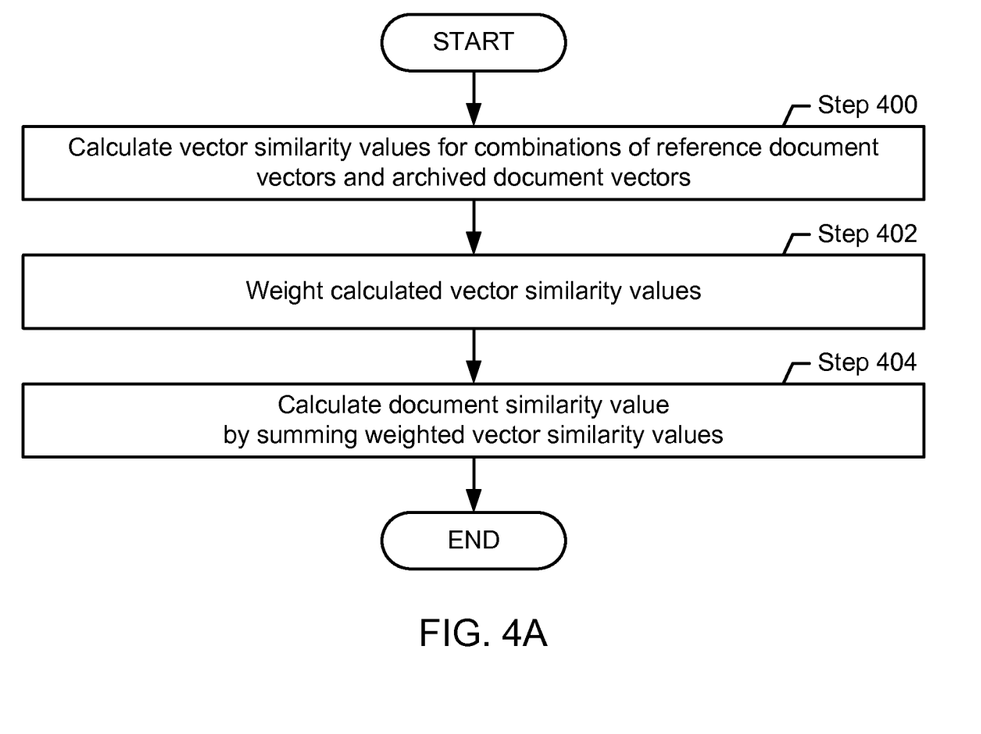
Figure 4B:
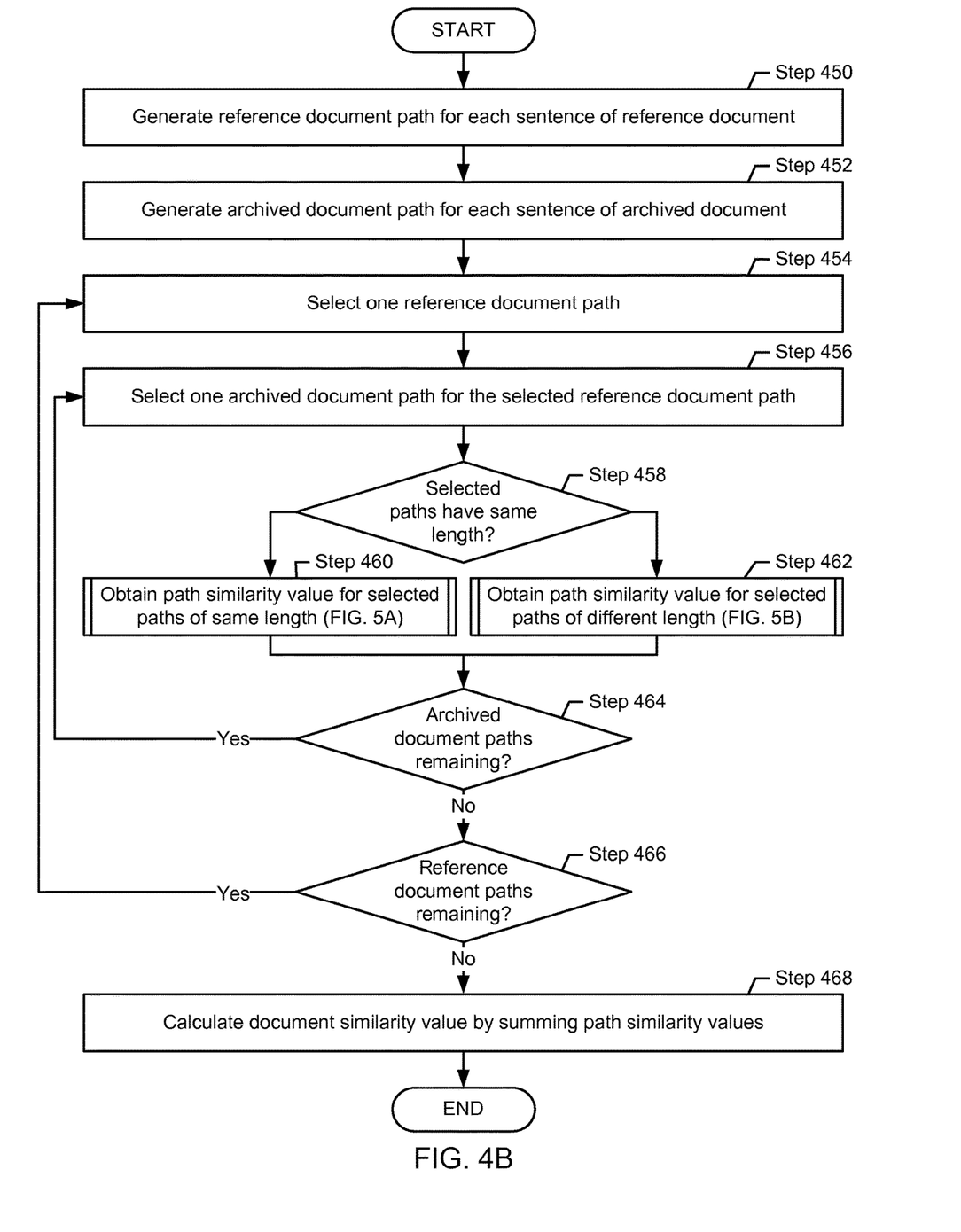

FIGS. 4A and 4B show methods for performing a similarity analysis of the reference document and an archived document.

FIG. 4A shows a method for performing the similarity analysis based on single vectors, such as vectors obtained using the k-skip-n-gram vectorization, described in Step 304 of FIG. 3.

Turning to FIG. 4A, in Step 400, vector similarity values are calculated for pairs of vectors that include a reference document vector and an archived document vector. In one or more embodiments of the technology, a vector similarity value is calculated using the cosine similarity. Using cosine similarity, the measure for similarity may be an angle between the vectors. Two vectors having the same orientation enclose a 0° angle and thus result in a cosine similarity of 1, whereas two vectors in orthogonal directions result in a cosine similarity of 0, regardless of their magnitude. In alternative embodiment of the technology, other methods may be used to assess similarity. The methods may obtain a vector similarity value of two vectors from the orientation of the vectors and/or from the magnitude of the vectors.

In one or more embodiments of the technology, both the reference document and the archived document may include multiple vectors. For example, these documents may include document text that may have been vectorized using the previously described k-skip-n-gram vectorization algorithm. Accordingly, multiple vectors may exist for each of the sentences, as previously described in Step 304. Further, additional vectors may exist for metadata of the reference document and the archived document. In one or more embodiments of the technology, each vector of the reference document text may be compared to each vector of the archived document text, for example, using cosine similarity, where each comparison may result in one vector similarity value. Further, each vector of the reference document metadata may be compared to each vector of the archived document metadata, for example, using cosine similarity. Each comparison may result in a vector similarity value.

In Step 402, a weight is applied to each vector similarity obtained in Step 400. In one or more embodiments of the technology, the weight is determined based on the k-skip-n gram vectorization performed in Step 302 of FIG. 3. A higher weight may be applied if more tokens are included in the k-skip-n-gram that a vector is obtained from, i.e., if the "n" of the k-skip-n-gram is higher. For example, a k-skip-3-gram (which includes three tokens) may receive a higher weight than a k-skip-2 gram (which includes two tokens). Further, a lower weight may be applied with increasing distance between tokens. Consider, for example, the previously introduced 1-skip-3 grams of the sentence "I hit the tennis ball." The sentence has 7 1-skip-3 grams. The 1-skip- 3-grams with no words skipped are: "I hit the", "hit the tennis", "the tennis ball". They may receive a higher weight than the 1-skip-3 grams "I hit tennis", "I the tennis" "hit tennis ball" and "hit the ball", where one word has been skipped. In one embodiment of the technology, weights may be optimized, for example, to maximize a document similarity value obtained in Step 404.

In one or more embodiments of the technology, the weights are multiplicatively applied to the corresponding vector similarity values to obtain weighted vector similarity values.

In Step 404, a document similarity value is calculated to quantify the document similarity, based on the similarity of content in the reference document and based on content in the archived document. The document similarity value may be obtained by summing all weighted vector similarity values, calculated in Step 402. A greater document similarity value, in accordance with one or more embodiments of the technology, indicates a higher degree of document similarity.

FIG. 4B shows a method for performing the similarity analysis based on a set of vectors grouped in a sentence, such as vectors of tokens in tokenized sentences that were individually vectorized, as described in Step 304 of FIG. 3.

Turning to FIG. 4B, in Step 450, a reference document path is generated for each sentence of the reference document, and in Step 452, an archived document path is generated for each sentence of the archived document. Similar methods may be used for reference document text and reference document metadata. A path may be generated by collecting the vectors corresponding to the tokens of a tokenized sentence. The order of the vectors may be identical to the order of the corresponding tokens. A path may thus be a series of vectors, with each vector representing a token in a tokenized sentence, i.e., a path may be understood as the vectorized equivalent to a sentence including words.

In Step 454, one reference document path is selected, and in Step 456, one archived document path is selected. Both the reference document and the archived document may include multiple sentences and multiple reference document paths and archived document paths may therefore exist. In one or more embodiments of the technology, the subsequently described methods may be performed for all combinations of reference document paths and archived document paths. The methods described in Steps 456-462 may be executed on the currently selected reference document path and archived document path and subsequently (or in parallel) another combination of reference document path and archived document path may be selected to perform the methods. The combination of selecting reference document path and archived document path, and applying the method to the selected paths may be repeated until all combinations of reference document paths and archived document paths have been processed.

In Step 458, a determination is made about whether the selected reference document path and the selected archived document path have the same length. If a determination is made that the paths have the same length, the method may proceed to Step 460. If the paths have a different length, the method may proceed to Step 462.

Steps 460 and 462 both describe methods for obtaining a path similarity value that describes the similarity between the reference document path and the archived document path. The path similarity value may thus be a measure for the similarity of the reference document sentence that the reference document path was obtained from and the archived document sentence that the archived document path was obtained from.

In Step 460, a path similarity value is obtained for a pair of paths, including a reference document path and an archived document path. The method of Step 460 may be performed if the reference document path and the archived document path have the same length, i.e., if they include the same number of vectors. Step 460 may be executed repeatedly, as previously described with reference to Steps 454 and 456. The details of Step 460 are described in FIG. 5A.

In Step 462, a path similarity value is obtained for a pair of paths, including a reference document path and an archived document path. The method of Step 462 may be performed if the reference document path and the archived document path have a different length, i.e., if they include a different number of vectors. Step 462 may be executed repeatedly, as previously described with reference to Steps 454 and 456. The details of Step 462 are described in FIG. 5B.

In Step 464, a determination is made about whether archived document paths are remaining. If archived document paths are remaining, the method may return to Step 456. If no archived document paths are remaining, i.e., either the method of Step 460 or the method of Step 462 have been executed for all archived document paths in combination with the current reference document path, the method may proceed to Step 466.

In Step 466, a determination is made about whether reference document paths are remaining. If reference document paths are remaining, the method may return to Step 454. If no reference document paths are remaining, i.e., either the method for Step 460 of the method of Step 462 have been executed for all combinations of reference document paths and archived document paths, the method may proceed to Step 468.

In Step 468, a document similarity value is calculated to quantify the document similarity, based on the similarity of content in the reference document and content in the archived document. The document similarity value may be obtained by summing all path similarity values, calculated in Step 460 and/or in Step 462. A greater document similarity value, in accordance with one or more embodiments of the technology, indicates a higher degree of document similarity.

Figure 5A:
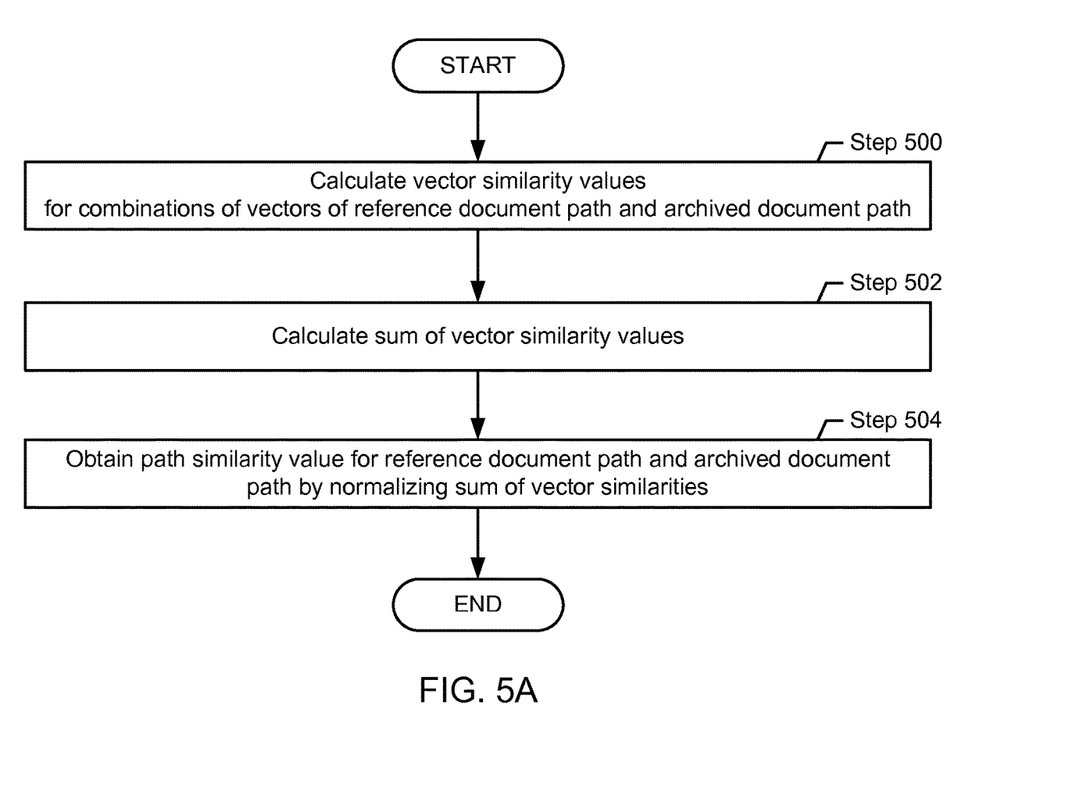
Figure 5B:
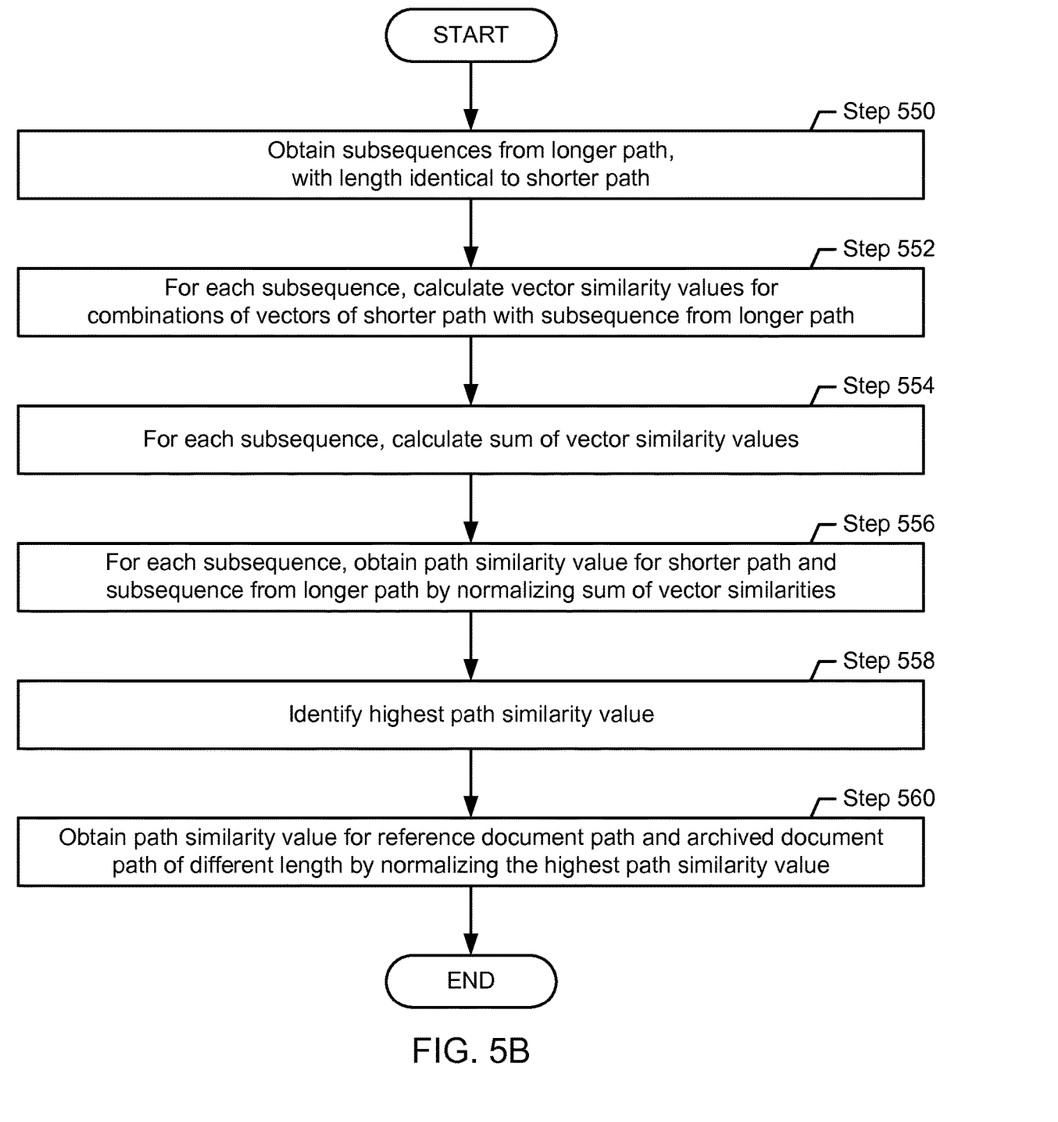

FIGS. 5A and 5B both describe methods for obtaining a path similarity value that describes the similarity between the reference document path and the archived document path. The method shown in FIG. 5A may be performed if the reference document path and the archived document path have the same length, i.e., if they include the same number of vectors, whereas the method shown in FIG. 5B may be performed if the reference document path and the archived document path have a different length, i.e., if they include a different number of vectors.

Turning to FIG. 5A, in Step 500, vector similarity values are obtained to assess the similarity of individual vectors of the reference document path and individual vectors of the archived document path. In one or more embodiments of the technology, one vector similarity value is calculated for each of the possible combinations of the vectors of the reference document path and of the vectors of the archived document path. For example, if both paths include two vectors, four vector similarity values are calculated. In one or more embodiments of the technology, a vector similarity value is calculated using the cosine similarity, i.e., a measure where the similarity of two vectors is assessed base on an angle between the vectors. In alternative embodiments of the technology, other methods may be used to assess similarity. The methods may obtain a similarity of two vectors from the orientation of the vectors and/or the magnitude of the vectors.

In Step 502, the vector similarity values for a reference document path and an archived document path, calculated in Step 500, are summed. In Step 504, a path similarity value is obtained by normalizing the sum of the vector similarity values, for example, by dividing the sum of the vector similarity values by the number of vectors in the path, i.e., the length of the path.

FIG. 5B shows a method for obtaining a path similarity value for a pair of paths, including a reference document path and an archived document path. The method shown in FIG. 5B may be performed if the reference document path and the archived document path have a different length, i.e., if they include a different number of vectors.

Turning to FIG. 5B, in Step 550, subsequences of vectors are obtained from the longer path. In one embodiment of the technology, the subsequences obtained from the longer path have a length that is identical to the length of the shorter path. For example, if a reference document path includes five vectors, corresponding to a five-word-sentence in the reference document, and an archived document path includes six vectors, corresponding to a six-word sentence in the archived document, one vector, corresponding to one word, is eliminated from the archived document path. A subsequence may be obtained by eliminating a number of vectors from the longer path to match the shorter path. In one embodiment of the technology, all possible subsequences are obtained by systematically dropping any combination of vectors that reduce the number of vectors in the longer path to the length of the shorter path. Consider, for example, the above scenario where five-vector-subsequences are obtained from a six-vector path by removing one vector. Six five-vector-subsequences are obtained in this scenario.

In Step 552, vector similarity values are obtained to assess the similarity of individual vectors of the shorter path and individual vectors of the subsequences obtained from the longer path. In one or more embodiments of the technology, vector similarity values are calculated separately for each of the possible combinations of the shorter path and the subsequences. Consider, for example, the above scenario where a five-vector-subsequence is obtained from a six-vector path by removing one vector. As noted above, there are six five-vector-subsequences to be analyzed. In this scenario, 25 vector similarity values may be calculated for each of the six possible combinations of the shorter path and a five-vector-subsequence. This process may then be repeated for each of the combination of shorter path and five-vector-subsequence. Accordingly, a total of 150 vector similarity values may be calculated. In one or more embodiments of the technology, a vector similarity value is calculated using the cosine similarity. In alternative embodiment of the technology, other methods may be used to assess vector similarity. The methods may derive a similarity of two vectors from the orientation of the vectors and or the magnitude of the vectors.

In Step 554, the sum of all vector similarity values, obtained in Step 552, is calculated, separately for each possible combination of the shorter path and one of the subsequences. In the above example that includes six five-vector-subsequences, six sums are obtained. In Step 556, the sums of the vector similarity values are normalized, for example, by dividing the sums of the vector similarity values by the number of vectors in the shorter path, i.e., the length of the shorter path, to obtain a path similarity value. In the above example that includes six five-vector-subsequences, the normalization is performed six times, separately for each sum.

In Step 558, the highest path similarity value is identified. In Step 560, the identified highest path similarity value is normalized to obtain a path similarity value for the reference document path and the archived document path. The normalization may be performed, for example, by dividing the highest path similarity value by the number of vectors in the longer path.

Embodiments of the technology may enable a system to detect content similarities in documents. Document texts and document metadata may be analyzed for similar content. The system may be able to perform the content similarity analysis across documents written in different languages, if, for example, a language-specific document quantification is performed. Depending on the document quantification used, the system may also be suitable for analyzing documents with domain-specific vocabulary, e.g., engineering documents or legal documents, and/or it may perform a general analysis suitable for documents that do not use a particular domain-specific vocabulary. Further, a content similarity analysis performed by the system may be faster and/or more cost effective than a similar analysis performed by a human expert. The content similarity analysis may therefore be particularly beneficial in scenarios where a similarity analysis performed by a human expert is impractical, inefficient or even impossible.

The document content similarity analysis, in accordance with one embodiment of the technology may be provided as a service. A user of the service may, for example, upload a reference document and one or more documents to be analyzed for content similarities, and may then receive the result of the similarity analysis from the service.

Embodiments of the technology may be implemented on a computing system. Any combination of mobile, desktop, server, embedded, or other types of hardware may be used. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor (s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the technology.

Further, one or more elements of the aforementioned computing system (600) may be located at a remote location and connected to the other elements over a network (612). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A system for assessing similarity of documents, comprising:
    a processor;
    a document repository including an archived document and an archived document metadata vector for archived document metadata, wherein the archived document metadata vector was created by tokenizing the archived document metadata and vectorizing the tokenized metadata to obtain the archived document metadata vector;
    a non-transitory computer readable medium, comprising instructions for:
    extracting a reference document text from a reference document;
    quantifying the reference document by:
        tokenizing a portion of the reference document and vectorizing the tokenized portion to obtain a reference document text vector for the portion of the reference document, and
        tokenizing reference document metadata and vectorizing the tokenized metadata to obtain a reference document metadata vector for the reference document metadata;
    associating at least a portion of the quantified reference document and the archived document based on the reference document metadata and the archived document metadata vector; and
    linking the at least the portion of the quantified reference document and the archived document based on the association between the at least the portion of the quantified reference document and the archived document.

2. The system of claim 1, wherein the document repository includes an archived document text vector for a portion of the archived document, the archived document text vector for the portion created by tokenizing the portion of the archived document and vectorizing the tokenized portion to obtain the archived document text vector for the portion, and
    wherein the association of the at least the portion of the quantified reference document and the archived document is based on the reference document text vector and the archived document text vector.

3. The system of claim 2, wherein associating at least the portion of the quantified reference document and the archived document comprises determining a similarity value of the at least the portion of the quantified reference document and the archived document by calculating a vector similarity value based on the reference document metadata vector and the archived document metadata vector.

4. The system of claim 3, wherein determining the similarity value of the at least the portion of the quantified reference document and the archived document includes calculating a vector similarity value based on the reference document text vector and the archived document text vector.

5. The system of claim 1, wherein the portion comprises the reference document, a word, a linguistic unit, a sentence or an entire paragraph.

6. The system of claim 1,
    wherein the reference document comprises text content or non-text content and
    the archived document comprises text content or non-text content.

7. A method for assessing similarity of documents, comprising:
    obtaining an archived document metadata vector for archived document metadata for an archived document, wherein the archived document metadata vector was created by tokenizing the archived document metadata and vectorizing the tokenized metadata to obtain the archived document metadata vector;
    extracting a reference document text from a reference document;
    quantifying the reference document by:
        tokenizing a portion of the reference document and vectorizing the tokenized portion to obtain a reference document text vector for the portion of the reference document, and
        tokenizing reference document metadata and vectorizing the tokenized metadata to obtain a reference document metadata vector for the reference document metadata;
    associating at least a portion of the quantified reference document and the archived document based on the reference document metadata and the archived document metadata vectors; and
    linking the at least the portion of the quantified reference document and the archived document based on the association between the at least the portion of the quantified reference document and the archived document.

8. The method of claim 7, wherein the method further comprises:
    obtaining an archived document text vector for a portion of the archived document, the archived document text vector for the portion created by tokenizing the portion of the archived document and vectorizing the tokenized portion to obtain the archived document text vector for the portion
    wherein the association of the at least the portion of the quantified reference document and the archived document is based on the reference document text vector and the archived document text vector.

9. The method of claim 8, wherein associating at least the portion of the quantified reference document and the archived document comprises determining a similarity value of the at least the portion of the quantified reference document and the archived document, by calculating a vector similarity value based on the reference document metadata vector and the archived document metadata vector.

10. The method of claim 9, wherein determining the similarity value of the at least the portion of the quantified reference document and the archived document includes calculating a vector similarity value based on the reference document text vector and the archived document text vector.

11. The method of claim 7, wherein the portion comprises the reference document, a word, a linguistic unit, a sentence or an entire paragraph.

12. The method of claim 7,
wherein the reference document comprises text content or non-text content and
the archived document comprises text content or non-text content.

13. A non-transitory computer readable medium, comprising instructions for:
obtaining an archived document metadata vector for archived document metadata for an archived document, wherein the archived document metadata vector was created by tokenizing the archived document metadata and vectorizing the tokenized metadata to obtain the archived document metadata vector;
extracting a reference document text from a reference document;
quantifying the reference document by:
tokenizing a portion of the reference document and vectorizing the tokenized portion to obtain a reference document text vector for the portion of the reference document, and
tokenizing reference document metadata and vectorizing the tokenized metadata to obtain a reference document metadata vector for the reference document metadata;
associating at least a portion of the quantified reference document and the archived document based on the reference document metadata and the archived document metadata vectors; and
linking the at least the portion of the quantified reference document and the archived document based on the association between the at least the portion of the quantified reference document and the archived document.

14. The non-transitory computer readable medium of claim 13, further comprising instructions for;
obtaining an archived document text vector for a portion of the archived document, the archived document text vector for the portion created by tokenizing the portion of the archived document and vectorizing the tokenized portion to obtain the archived document text vector for the portion
wherein the association of the at least the portion of the quantified reference document and the archived document is based on the reference document text vector and the archived document text vector.

15. The non-transitory computer readable medium of claim 14, wherein associating at least the portion of the quantified reference document and the archived document comprises determining a similarity value of the at least the portion of the quantified reference document and the archived document, by calculating a vector similarity value based on the reference document metadata vector and the archived document metadata vector.

16. The non-transitory computer readable medium of claim 15, wherein determining the similarity value of the at least the portion of the quantified reference document and the archived document includes calculating a vector similarity value based on the reference document text vector and the archived document text vector.

17. The non-transitory computer readable medium of claim 13, wherein the portion comprises the reference document, a word, a linguistic unit, a sentence or an entire paragraph.

18. The non-transitory computer readable medium of claim 13,
wherein the reference document comprises text content or non-text content and
the archived document comprises text content or non-text content.

* * * * *